Jan. 7, 1958 A. E. MOELLER 2,818,756
WIRE STRIPPERS

Filed April 21, 1955 6 Sheets-Sheet 2

INVENTOR.
ARTHUR E. MOELLER
BY *Wallace and Cannon*
ATTORNEYS

Jan. 7, 1958  A. E. MOELLER  2,818,756
WIRE STRIPPERS
Filed April 21, 1955  6 Sheets-Sheet 3

INVENTOR.
ARTHUR E. MOELLER
BY
*Wallace and Cannon*
ATTORNEYS

Jan. 7, 1958 A. E. MOELLER 2,818,756
WIRE STRIPPERS
Filed April 21, 1955 6 Sheets-Sheet 4

INVENTOR.
ARTHUR E. MOELLER
BY
Wallace and Cannon
ATTORNEYS

Jan. 7, 1958     A. E. MOELLER     2,818,756
WIRE STRIPPERS Filed April 21, 1955                                     6 Sheets-Sheet 5

INVENTOR.
ARTHUR E. MOELLER
BY
*Wallace and Cannon*
ATTORNEYS

Jan. 7, 1958 A. E. MOELLER 2,818,756
WIRE STRIPPERS

Filed April 21, 1955 6 Sheets-Sheet 6

INVENTOR.
ARTHUR E. MOELLER
BY
Wallace and Cannon
ATTORNEYS

United States Patent Office 2,818,756
Patented Jan. 7, 1958

2,818,756

WIRE STRIPPERS

Arthur E. Moeller, Chicago, Ill., assignor to Runzel Cord & Wire Co., Chicago, Ill., a corporation of Illinois Application April 21, 1955, Serial No. 502,847

21 Claims. (Cl. 81—9.51)

This invention relates to wire strippers, and, more specifically, to devices which are particularly well adapted for stripping insulation from electric wires and the like.

Other devices have been heretofore known in the art for stripping insulation from wires. However, such other devices have had certain inherent disadvantages such as, for example, being difficult to operate; distorting or deforming the shapes of the wire so as to require a straightening operation on the wire before it is used; being complicated and expensive in construction; being limited to the stripping of short lengths of insulation; or being unreliable in operation. It is an important object of my invention to overcome these disadvantages.

Another object of my invention is to afford a wire stripper which is constructed and operates in a novel and expeditious manner.

Another object of my invention is to afford a novel wire stripper which is effective to strip relatively long lengths of insulation.

Yet another object of my invention is to afford a novel wire stripper which doesn't deform the wire being stripped.

A further object of my invention is to afford a novel wire stripper which strips insulation with a straight line motion in a novel and expeditious manner.

Another object of my invention is to afford a novel wire stripper which may be quickly and easily adjusted to handle wires of different diameters and lengths, and to strip different lengths of insulation.

Another object of my invention is to strip the insulation from the wire, or the like, in a novel and expeditious manner, rather than pull the wire from the insulation, which has been common practice in stripping machines heretofore known in the art.

A further object of my invention is to afford a novel wire stripper of the aforementioned type which is effective to strip insulation from both ends of a predetermined length of wire in a novel and expeditious manner.

Another object of my invention is to provide a novel wire stripper which is effective to sever a predetermined length of wire from a longer piece of wire and strip a predetermined length of insulation from both ends of the predetermined length of wire in a novel and expeditious manner.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

A wire stripper 25, embodying the principles of my invention, is shown in the drawings to illustrate the preferred embodiment of my invention.

Figure 1:
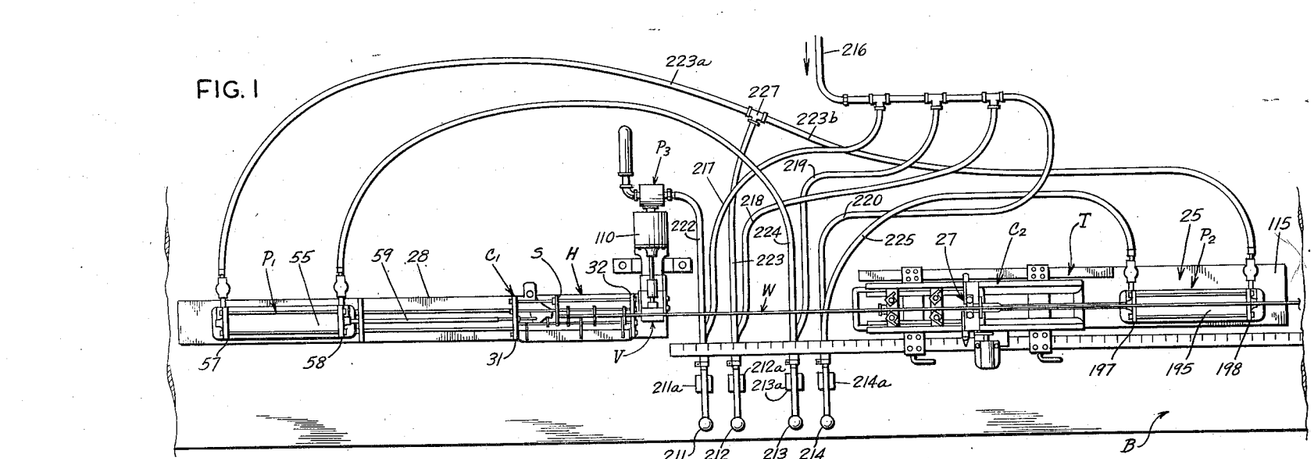
Fig. 1 is a top plan view of a wire stripper embodying the principles of my invention.

In general, Fig. 1, the wire stripper 25 embodies a head unit H and a tail unit T, each including a carriage $C_1$ and $C_2$, and a power unit $P_1$ and $P_2$, respectively. The head unit H and the tail unit T are mounted on a suitable support such as, for example, a table B with the carriages $C_1$ and $C_2$ and the power units $P_1$ and $P_2$ disposed in alignment with each other. The power units $P_1$ and $P_2$ are connected to the carriages $C_1$ and $C_2$ and are operable upon actuation of the wire stripper 25, to move the carriages $C_1$ and $C_2$ toward and away from each other.

The operation of the wire stripper 25 is such that a length of wire may be manually fed by an operator from a suitable source of supply such as, for example, a reel, not shown, over the power unit $P_2$ the carriage $C_2$ and the carriage $C_1$ into position wherein the front end of the wire is disposed in abutting engagement with a stop S on the carriage $C_1$. A vise V may then be actuated in a manner to be discussed in greater detail hereinafter to thereby grip and hold the length of wire extending between the carriage $C_1$ and $C_2$. The power units $P_1$ and $P_2$ may then be operated to thereby actuate the carriages $C_1$ and $C_2$ and thereby cause the length of wire W extending to the left, as viewed in Fig. 1, of a cut-off knife 27 on the carriage $C_2$ to be severed from the remainder of the supply of wire, and to effect the stripping of a predetermined length of insulation from both ends of the thus severed length of wire W.

Figure 11:
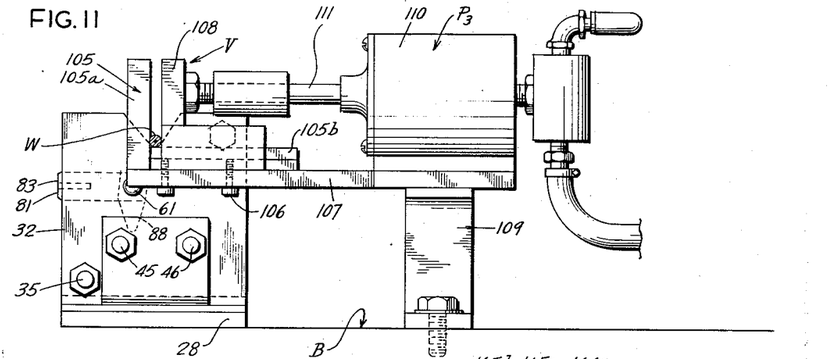
Fig. 11 is a detail side elevational view of a portion of the mechanism shown in Fig. 1.
Figure 12:
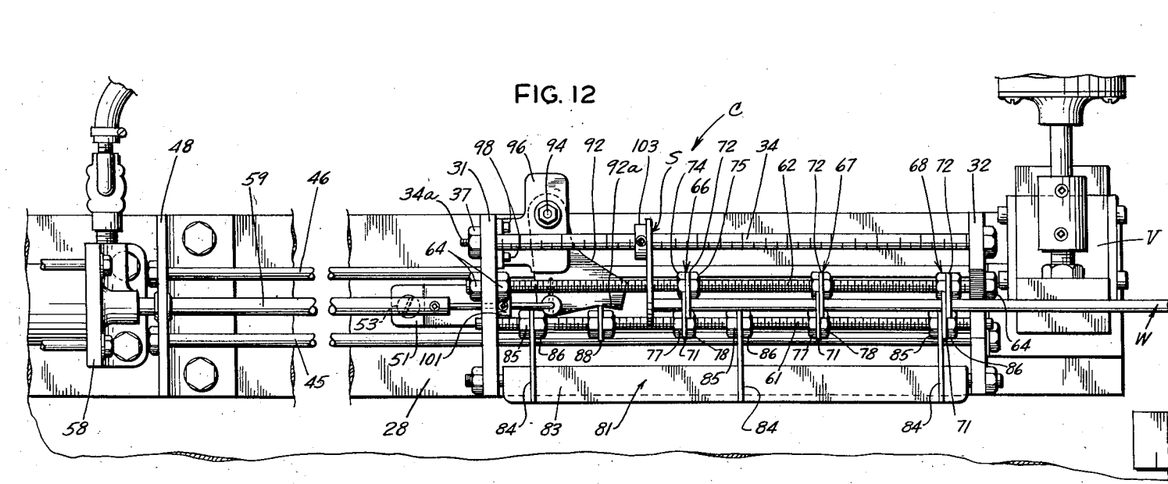
Fig. 12 is an enlarged detail top plan of a portion of the wire stripper shown in Fig. 1.
Figure 13:
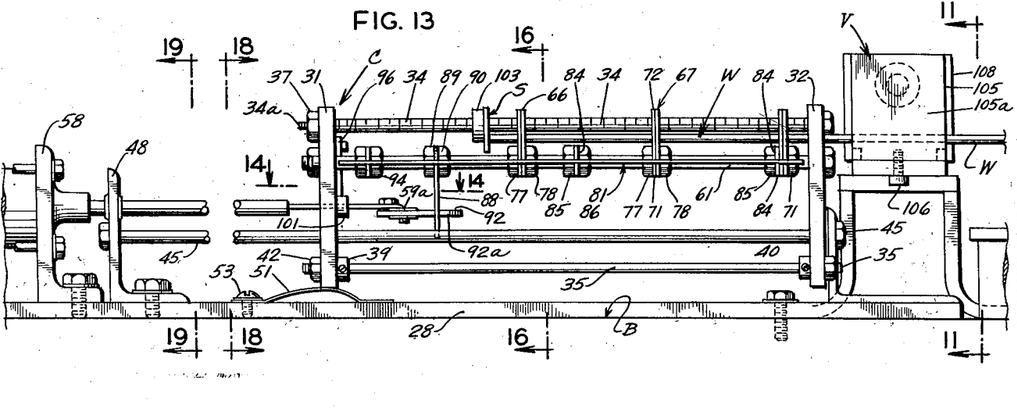
Fig. 13 is a detail side elevation of the mechanism shown in Fig. 12.

The head unit H, shown in Figs. 1 and 11–19, comprises an elongated base 28, Figs. 1, 12 and 13, made of any suitable material such as, for example, steel plate, and the power unit $P_1$ and the carriage $C_1$ are mounted on the opposite end portions thereof. The base 28 is mounted on any suitable supporting member such as, for example, a table B.

Figures 16, 17, 18, 19:
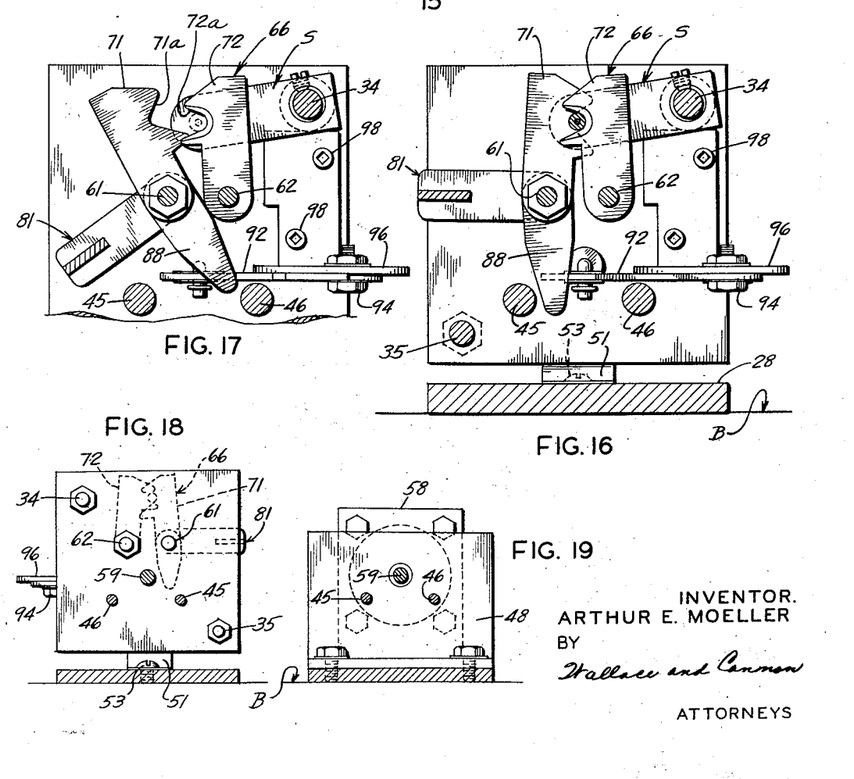
Fig. 16 is a detail sectional view taken substantially along the line 16—16 in Fig. 13.
Fig. 17 is a detail sectional view similar to Fig. 16 but showing the parts thereof in different operative position.
Fig. 18 is a detail sectional view taken substantially along the line 18—18 in Fig. 13.
Fig. 19 is a detail sectional view taken substantially along the line 19—19 in Fig. 13.

The carriage $C_1$ is substantially rectangular in shape and embodies two end plates 31 and 32, made of suitable material such as steel plate, which are held in parallel spaced relation to each other by two spacer rods 34 and 35 disposed in diagonally opposite corners, Figs. 13 and 16. The rod 34 is threadedly engaged at one end in the plate 32 and has a reduced end portion 34a which extends through the other plate 31, and a nut 37 is mounted at the end portion 34a in abutting relation to the outer face of the plate 31. The rod 35 extends through the plates 31 and 32 and has two collars 39 and 40, Fig. 13, mounted on the opposite end portions thereof in abutting relation to the inner face of the plates 31 and 32, respectively, and has two nuts 42 and 43 threaded on the opposite outer end portions thereof and disposed in abutting engagement with the outer faces of the plates 31 and 32, respectively.

Two slide-rods 45 and 46, Figs. 12, 13 and 16, are disposed in horizontally spaced relation to each other and are mounted in, and extend between, two mounting brackets 48 and 49 mounted on the upper face of the base 28, Fig. 13. The slide rods 45 and 46 extend through the end plates 31 and 32 of the carriage $C_1$, and the carriage $C_1$ is slidably mounted on, and supported by, the slide rods 45 and 46, between the brackets 48 and 49 in upwardly spaced relation to the base 28.

When the carriage $C_1$ is disposed in normal, at rest position, it is so disposed on slide rods 45 and 46 that the plate 32 is disposed adjacent to the bracket 49, and the plate 31 is disposed a substantial distance from the bracket 48, as shown in Fig. 13. A substantially arcuately shaped leaf spring 51 is secured to the upper face of the base 28 by suitable means such as a screw 53 extending through one end thereof, Fig. 4. The spring 51 is disposed in convex-upwardly position on the base 28 below the normal at rest position of the plate 31, in position to frictionally and yieldingly engage the lower edge of the plate 31 to thereby yieldingly hold the carriage $C_1$ in such position. The frictional engagement of the spring 51 with the plate 31 is sufficiently great to require a substantial force to be applied to the carriage $C_1$ to dislodge the latter from this position toward the bracket 48, or, in other words, to the left as viewed in Fig. 13, as will be discussed in greater detail presently.

The power unit $P_1$ comprises an elongated air cylinder 55 mounted between, and supported by two brackets 57 and 58, Fig. 1, on the upper face of the base 28 in longitudinal parallel relation thereto. A piston 59, Figs. 1, 12 and 13 is reciprocably mounted in the cylinder 55 and has a front end portion projecting outwardly from the cylinder 55 and through the bracket 48 and the plate 31.

Two supporting rods 61 and 62, Figs. 12, 13 and 16, extend between and are mounted in the end plates 31 and 32 of the carriage $C_1$. The supporting rod 62 is non-rotatably secured in the plates 31 and 32 by lock-nuts 64 mounted on the opposite end portions thereof. The supporting rod 61 is rotatably journalled in the plates 31 and 32 for a purpose which will be discussed in greater detail presently.

Three knives 66, 67 and 68 are mounted on the supporting rods 61 and 62 in horizontally spaced, substantially parallel relation to each other. Each of the knives 66–68 embodies two elongated blades 71 and 72, Figs. 12, 16 and 17, each having oppositely disposed substantially U-shaped cutting edges 71a and 72a, respectively. The supporting rod 62 extends through the lower end portion of each of the blades 72, Fig. 16, and the blades 72 are fixedly secured relative to the supporting rod 62 by clamping nuts 74 and 75, Fig. 12, threadedly engaged with the supporting rod 62 and disposed in clamping engagement with the blade 72. The supporting rod 61 extends through the lower end portion of each of the blades 71, and each of the latter is fixedly secured relative to the supporting rod 61, for rotation therewith, by respective pairs of clamping nuts 77 and 78 threadedly mounted on the supporting rod 61 and clampingly engaged with the respective blades 71. Hence, it will be seen that the blades 71 and 72 are fixedly but adjustably secured on the rods 61 and 62 and the blades 71 are secured to the rod 61 for rotation therewith.

An outwardly projecting weight 81, Figs. 12 and 16, in the form of an elongated bar 83 having a plurality of transversely extending, substantially parallel, supporting legs 84 is mounted on the supporting rod 61 in position to project outwardly from the supporting rod 61 on the other side thereof from the supporting rod 62. The supporting rod 61 extends through the inner end portions of legs 84, and the latter are fixed to the supporting rod 61 for rotation therewith by clamping nuts 85 and 86, Fig. 12, threadedly mounted on the supporting rod 61. With the weight 81 mounted on the supporting rod 61 in this manner, it will be seen that it is effective to urge the rod 61 to rotate in a counterclockwise direction, as viewed in Figs. 16 and 17, to thereby urge the knife blade 71 to rotate in a similar direction and urge the cutting edges 71a outwardly away from the cutting edges 72a.

Figure 14:
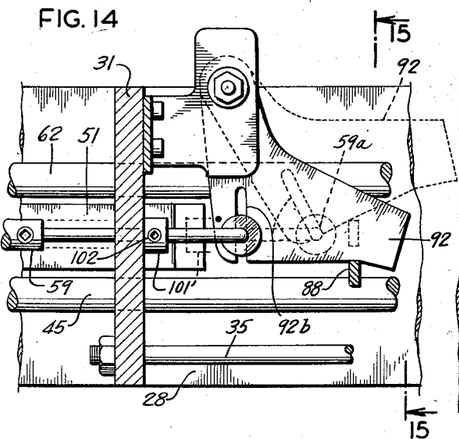
Fig. 14 is a detail sectional view taken substantially along the line 14—14 in Fig. 13.
Figure 15:
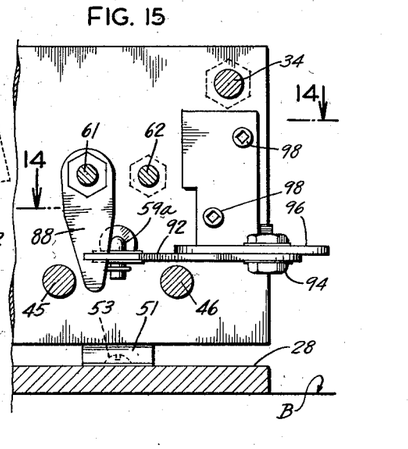
Fig. 15 is a detail sectional view taken substantially along the line 15—15 in Fig. 14.

A downwardly projecting elongated lever arm 88, Figs. 12, 13, 14 and 15, is mounted on the supporting rod 61 and fixedly secured thereto for rotation therewith, by suitable clamping nuts 89 and 90, Fig. 13. A substantially flat horizontally disposed cam plate 92, Figs. 12, 13, and 15, is rotatably mounted by a bolt 94 on a mounting bracket 96 projecting inwardly from and secured to the inner face of the plate 31 by suitable means such as screws 98. The cam edge 92a of the cam 92 is disposed in position to engage the edge of the lower end portion of the lever arm 88 on the opposite side of the latter from the weight 81 and is thereby effective to limit the counterclockwise rotation of the knife blades 71 by the weight 81, and, upon movement of the cam 92 from the position shown in broken lines to the position shown in solid lines in Fig. 14, is effective to rotate the lever arm 88 in a clockwise direction, as viewed in Fig. 17, against the urging of the weight 81, from the position shown in Fig. 17 to the position shown in Fig. 16. Such rotation of the lever arm 88 is effective to similarly rotate the rod 61, the weight 81, and the blades 71 of the knives 66–68.

The front end portion of the piston 59, which projects through the plate 31 of the carriage $C_1$, has a downwardly bent end 59a disposed thereon, Fig. 13. The end 59a of the piston 59 projects downwardly through a horizontally disposed elongated slot 92b formed in the cam 92, Figs. 12 and 14. A collar 101 is mounted on the front end portion of the piston 59 inwardly of the end 59a, between the end 59a and the plate 31 of the carriage $C_1$. The collar 101 is adjustably mounted on the free end portion of the piston 59, being slidably mounted on the latter and held in adjusted position by a set screw 102 mounted in the collar 101 and extending therethrough into engagement with the free end of the piston 59.

When the head unit H is disposed in normal, at rest position, with the carriage $C_1$ disposed in position adjacent to the brackets 49 as shown in Fig. 13, and with the piston 59 disposed in fully extended position, the free end of the piston 59 is so disposed in the end plate 31 that the cam 92 is disposed in the position shown in broken lines in Fig. 14. At this time, the collar 101 is disposed in the position shown in broken lines in Fig. 14, wherein it is disposed in inwardly spaced relation to the inner face of the plate 31.

Upon actuation of the power unit P in the operation of my machine, which will be discussed in greater detail presently, the piston 59 moves to the left, as viewed in Figs. 1 and 14, into the casing 55 to thereby move the end 59a and the collar 101 to the left. Movement of the end 59a of the piston 59 to the left is effective to pivot the cam 92 in a clockwise direction as viewed in Fig. 14; and, through the engagement of the cam edge 92a with the lever arm 88 to thereby pivot the lever arm 88, supporting rod 61, and knife blades 71 in a clockwise direction as viewed in Figs. 16 and 17. Such movement of the lever arm 88, supporting rod 61, and knife blades 71 is effective to move the cutting edges 71a on the knife blades 71 toward the cutting edges 72a on the knife blade 72 until such time as the collar 101 engages the inner face of the plate 31. When the collar 101 engages the plate 31, the movement of the piston 59 relative to the carriage $C_1$ is stopped thereby, and, hence, movement of the blades 71 toward the blades 72 is also stopped. When the blades 71 are thus stopped, the cutting edges 71a and 72a of the blades 71 and 72, respectively, are disposed in the position relative to each other shown in Figs. 12 and 16, in which position they strippingly engage a wire previously placed therebetween, as will be discussed in greater detail hereinafter.

During the movement of the collar 101 into engagement with the plate 31, and the movement of the blades 71 toward the blades 72, the spring 51 is effective to hold the carriage $C_1$ in the normal position shown in Fig. 13. After the collar 101 engages the plate 31, continued movement of the piston 59 is effective to overpower the spring 51 and move the carriage $C_1$ to the left along the slide-rods 45 and 46 from the position shown in Fig. 13. Such movement of the carriage $C_1$ through the remainder of the inward stroke of the piston 59, moves the knives 66–68 therewith, and is effective to strip the insulation from that portion of such a wire extending between the stop S and the knife 68 as will be discussed presently.

The purpose of the knives 66 and 67 is different from the purpose of the knife 68. The knife 68 is intended to completely sever the insulation disposed on a wire positioned between the blades 71 and 72 thereof during the operation of my novel machine. The knives 66 and 67, in the operation of my machine, preferably do not sever or cut the insulation on the wire disposed between the blades 71 and 72 thereof, but merely firmly grip such insulation between the blades 71 and 72 thereof. Thus, it will be seen that the blades 71 and 72 of each of the knives 66, 67 and 68 being identical, the blades 71 and 72 of the knives 66 and 67 must be adjusted so as not to close as completely as the blades 71 and 72 of the knife 68 during the blade closing actuation of the lever 88 by the cam 92. This may be readily accomplished by properly positioning the blades 71 and 72 of the knives 66–68, on the supporting rods 61 and 62, the blades 71 and 72 of the knives 66 and 67 being so disposed on the rod 61 and 62 that the cutting edges 71a on the blades 71 of the knives 66 and 67 are not moved as close to the cutting edges 72a on the blades 72 of the knives 66 and 67 as is the cutting edge 71a of the knife 68 relative to the cutting edge 72a thereof during a blade closing actuation of the rod 61.

When the wire W is fed into my novel wire stripper 25, it is fed longitudinally thereof from right to left as viewed in Fig. 12, into such position that the free end of the wire W is disposed in abutting relation to the stop S mounted on the rod 34. The stop S is adjustable on the rod 34 being slidably mounted thereon, and being fixed thereto by suitable means such as a stop screw 103, Fig. 12. If desired, the rod 34 may be marked with calibrations to assist in setting the stop S to the proper position thereon for the particular wire-stripping operation to be performed with my machine.

The vise V of my novel wire stripper 25 includes a substantially L-shaped stationary jaw 105 having a substantially vertically disposed head portion 105a and a substantially horizontally disposed base portion 105b. The jaw 105 is fixedly and, preferably, adjustably mounted on one end portion of a horizontally disposed elongated supporting member 107 by suitable means such as screws 106, Figs. 11 and 13. The other end portion of the supporting member 107 is also disposed under a suitable power unit such as an air operated motor $P_3$, Figs. 1 and 3, and affords the mounting base therefor. The supporting member 107 is mounted on suitable supporting brackets 109, mounted on the table B, and is supported thereby in parallel spaced relation to the table B in position to dispose the stationary jaw 105 between the carriages $C_1$ and $C_2$.

A movable jaw 108 is slidably mounted on the supporting member 107 and the base portion 105b of the fixed jaw 108 for horizontal sliding movement thereon toward and away from the head portion 105a.

The power unit P, comprising a cylinder 110 and a piston 111, is mounted on the supporting member 107 transversely to the base 28 with the free end of the piston 111 secured to the movable jaw 108. The power unit $P_3$ is operable, upon actuation to move the movable jaw 108 toward and away from the fixed jaw 105. Thus it will be seen that with the jaw 108 disposed in open position relative to the fixed jaw 105, and with the blades 71 and 72 of the knives 66–68 disposed in open position, the free end portion of the wire W may be laid into the open vise V and open knives 66–68, with the free end thereof disposed in abutting relation to the stop S. The vise V may thereupon be closed on the wire W to thereby hold the latter in stationary position. With the wire W thus held, the power unit $P_1$ may be actuated to cause the knives 66–68 to close, knife 68 severing the insulation on the wire W and the knives 66 and 67 firmly gripping the insulation thereof. Upon completion of this portion of the actuation of the power unit $P_1$, the collar 101 has been moved by the piston 59 into engagement with the inner face of the plate 31, the spring 51 being effective to hold the carriage $C_1$ in normal at rest position during this movement of the piston 59. However, upon continued actuation of the power unit $P_1$ the piston 59 moves to the left of the position shown in Fig. 13 to thereby cause the collar 101 to be moved to the left and slide the carriage $C_1$ to the left on the slide-rods 45 and 46. This movement of the carriage $C_1$ is effective to similarly move the knives 66–68 and thereby strip the insulation disposed to the left of the knife 68 from the left end of the wire held in the vise V as viewed in Figs. 1 and 12.

With the knives 66 and 67 assisting in the pulling of the insulation from the wire W, the pull on the insulation is spread over a substantial area. I have found that with my novel device, the tendency of the insulation to bunch-up ahead of the knife 68 is substantially eliminated. This has been one of the problems heretofore bothersome in the art, and with my novel wire stripper, a relatively long portion of insulation may be stripped from a wire in one operation without excessive bunching of the insulation ahead of the knife 68.

Figure 4:
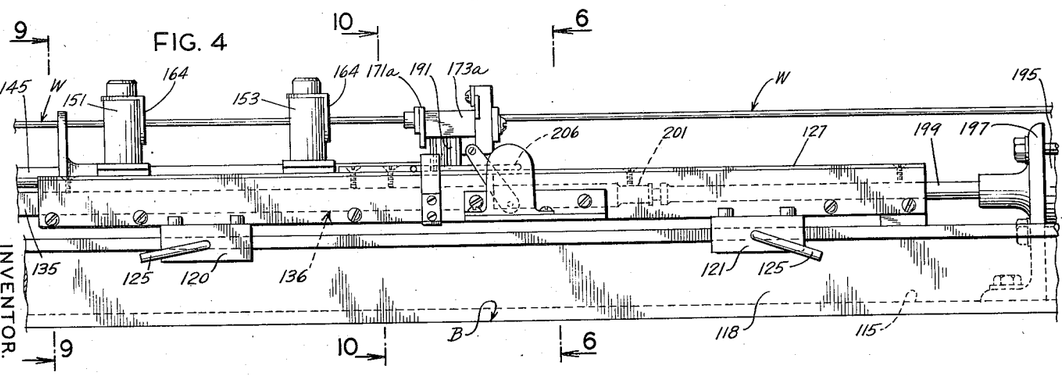
Fig. 4 is a detail side elevational view of the mechanism shown in Fig. 3.
Figure 5:
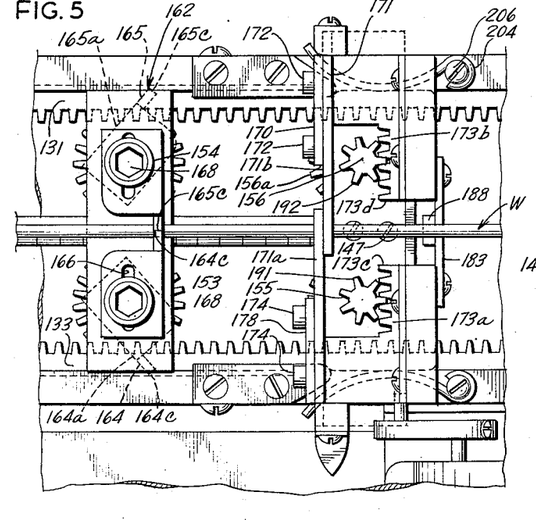
Fig. 5 is a detail top plan view of a portion of the mechanism shown in Fig. 3.
Figure 6:
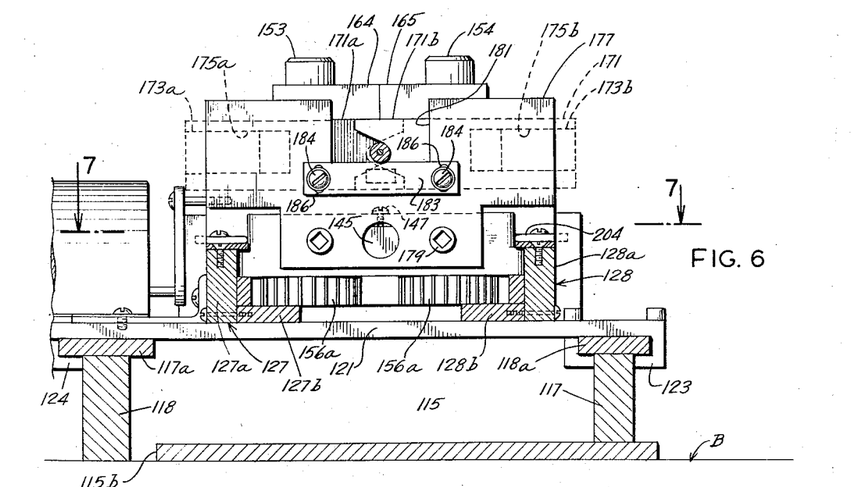
Fig. 6 is a detail sectional view taken substantially along the line 6—6 in Fig. 4.
Figure 7:
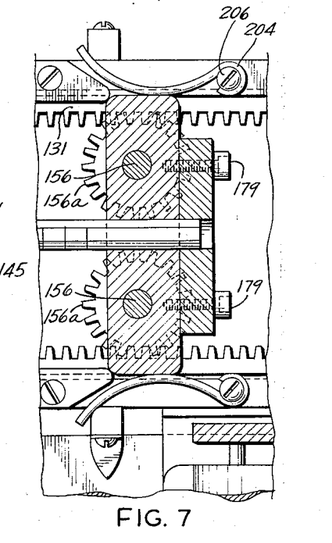
Fig. 7 is a detail sectional view taken substantially along the line 7—7 in Fig. 6.
Figure 8:
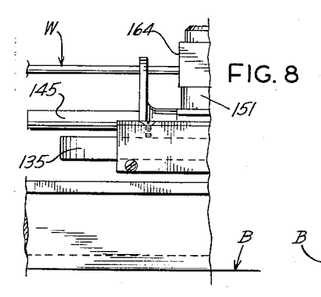
Fig. 8 is a detail view of a portion of the mechanism shown in Fig. 4.
Figure 9:
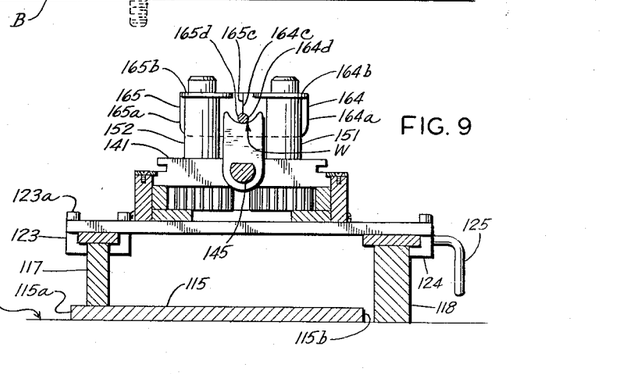
Fig. 9 is a detail sectional view taken substantially along the line 9—9 in Fig. 4.
Figure 10:
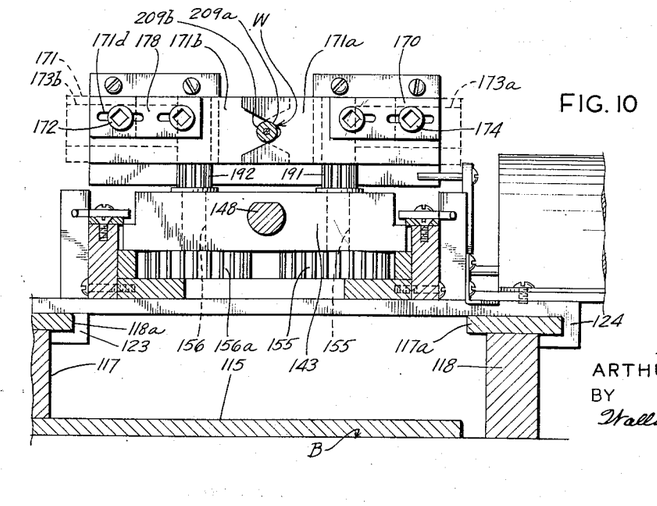
Fig. 10 is a detail sectional view taken substantially along the line 10—10 in Fig. 4.

The tail unit T, shown in Figs. 1 to 10, inclusive, embodies an elongated supporting base 115, Figs. 1 and 6, made of suitable material such as, for example, plate steel. A substantially T-shaped rail 117, Figs. 6, 9 and 10, is mounted on and secured to the upper face of the base 115 adjacent one longitudinal edge 115a thereof, and extends longitudinally of the base 115. Another substantially T-shaped rail 118 is disposed in upright position on, and secured to the upper face of the table B in outwardly spaced parallel relation to the other longitudinal edge 115b of the base 115. The base 115 is mounted on the table B in longitudinal alignment with the base 28 of the head unit H, and the rails 117 and 118 are disposed in horizontally spaced parallel relation to each other. Two elongated beams 120 and 121, Figs. 3 and 6, extend transversely across the rails 117 and 118 in horizontally spaced parallel relation to each other. Each of the beams 120 and 121 embodies downwardly and inwardly projecting flanges 123 and 124 at its opposite ends, Fig. 6, which engage beneath the side edges 117a and 118a of the rails 117 and 118, respectively, to thereby secure the beams 120 and 121 against vertical and horizontal movement transverse to the rails 117 and 118. The beams 120 and 121 are adjustable longitudinally of the rail 118 and may be secured in adjusted position by suitable means such as screws 125 extending through the flanges 124, Figs. 1, 3 and 4. The flanges 123 are secured in tight clamping engagement with the upper end portion of the rail 117 by screws 123a so that movement of the beams 120 and 121 longitudinally of the beam 118 is effective to also move the beam 117 and the base 115 longitudinally of the beam 118. In this manner the base 115, and associated parts mounted thereon may be readily moved, as a unit, along the beam 118 to thereby adjust the position of the tail T toward or away from the head unit H. If desired, the upper face of the rail 118 may be calibrated so that an indicator, such as a pointer 126, on the carriage $C_2$, Fig. 5, may be used in conjunction therewith to visibly indicate the distance of the tail unit T from the head unit H.

Figure 3:
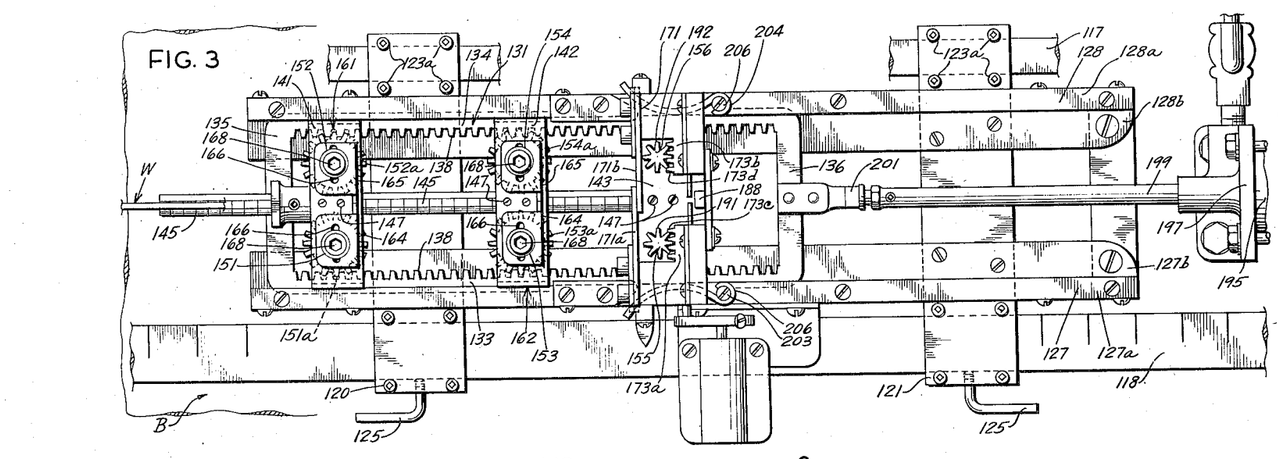
Fig. 3 is a detail top plan view of a portion of the mechanism shown in Fig. 1.

Two parallel guide rails 127 and 128, Figs. 3 and 6, disposed in horizontally spaced parallel relation to each other, are connected to the upper face of the beams 120 and 121 by suitable means, such as, for example, welding, in upwardly spaced parallel relation to the base 115, and inwardly of the rails 117 and 118. The guide rails 127 and 128 are substantially L-shaped and comprise vertically disposed side rails 127a and 128a, and inwardly projecting bottom rails 127b and 128b, respectively, Fig. 6.

An elongated substantially rectangular-shaped rack 131, Fig. 3, having two elongated side members 133 and 134, and two elongated end members 135 and 136, is slidably mounted in the guide rails 127 and 128 for longitudinal reciprocable motion relative thereto. The side members 133 and 134 of the rack 131 are disposed on the bottom rails 127b and 128b in snug fitting, but longitudinally slidable, parallel relation to the side rails 127a and 128a. Gear teeth 138 are formed in the inner faces of the side members 133 and 134 throughout the length thereof.

Three substantially inverted T-shaped supporting blocks 141, 142 and 143, Figs. 3, 4, 9, and 10, are mounted between the guide rails 127 and 128 in horizontally spaced parallel relation to each other. An elongated rod 145, disposed intermediately between the guide rails 127 and 128, in parallel relation thereto, extends through the mounting blocks 141, 142 and 143. The blocks 141–143 are adjustable longitudinally of the rod 145, and are secured in adjusted position on the rod 145 by suitable means such as screws 147, Fig. 3.

Two shafts 151 and 152, 153 and 154, and 155 and 156, are journalled in upwardly extending upright position in each of the blocks 141, 142 and 143 respectively, Figs. 3, 4, 9 and 10. Pinion gears 151a, 152a, 153a, 154a, 155a, and 156a are mounted on the lower end portions of the shafts 151–156, respectively. The gears 151a, 153a and 155a are meshed with the teeth 138 on the side member 133 of the rack 131, and the gears 152a, 154a and 156a are meshed with the teeth 138 on the side member 134 of the rack 131, Fig. 3.

Two knives 161 and 162 are rotatably mounted on the blocks 141 and 142 by the pairs of shafts 151 and 152, and 153 and 154, respectively, Figs. 3, 4 and 9. Each of the knives 161 and 162 comprises two blades 164 and 165, Figs. 3 and 4. The blades 164 and 165 are each of substantially inverted L-shape, having a substantially flat vertically disposed body portion 164a and 165a, respectively, from the upper edges of which project substantially flat horizontally disposed flanges 164b and 165b, respectively. The flanges 164b and 165b have elongated slots 166 formed therein, and the blades 164 are mounted on the shafts 151 and 153 with the flanges 164b disposed on the upper ends thereof, and screws or bolts 168 extending through the slots 166 into the shafts 151 and 153 to thereby secure the respective blades 164 on the shaft 151 and 153 with the body portions 164a of the blades 164 disposed in substantially parallel relation to the shaft 151 and 153. Similarly, the respective blades 165 are secured to the shafts 152 and 154 with the flange 165b disposed on the upper ends of the shafts 152 and 154, and screws or bolts such as the screws 168 extending through slots 166 in the flange 165b into the shaft 152 and 154 to thereby secure the blades 165 on the shafts 152 and 154 with the body portions 165a thereof disposed in substantially parallel relation to the shafts 152 and 154.

Figure 2:
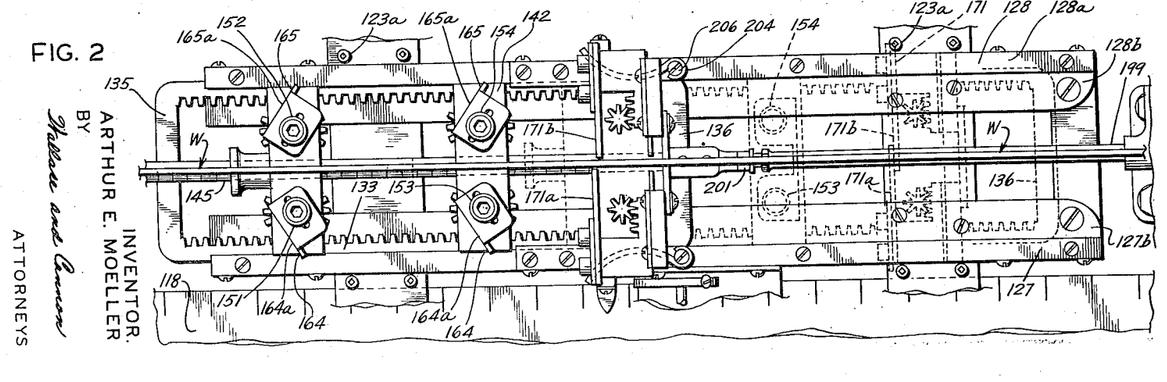
Fig. 2 is a detail plan view of a portion of the device shown in Fig. 1.

When the blades 164 and 165 are disposed in normal, unactuated, open position as shown in Fig. 2, and in broken lines in Fig. 5, the body portions 164a and 165a thereof are disposed in outwardly facing relation to each other. The blades 164 and 165 also have an actuated, closed position, shown in solid lines in Figs. 3 and 5, wherein the body portions 164a and 165a are disposed in longitudinal alignment with each other, with the adjacent inner edges 164c and 165c disposed closely adjacent to each other. Substantially U-shaped cutting edges 164d and 165d are formed in the inner edges 164c and 165c of the blades 164 and 165, respectively, and are so disposed relative to each other that they will receive therebetween a wire such as the wire W for a purpose which will be discussed in greater detail presently.

A third knife 171, Figs. 3, 5 and 10, embodying two blades 171a and 171b is mounted on the block 143. The blades 171a and 171b, rather than being rotatably mounted relative to each other as are the blades 164 and 165, are slidably mounted on the block 143 for reciprocatory movement toward and away from each other. The blades 171a and 171b are substantially rectangular in shape, Fig. 10, and are mounted on the outer end portions of two elongated rack bars 173a and 173b, Figs. 3, 6 and 10, by screws 172 and 174, respectively, Figs. 3, 5 and 10. Reinforcing plates 170 and 178 are mounted on the outer end portions of the blades 171a and 171b to stiffen the latter, and the screws 172 and 174 extend through elongated slots 171c and 171d in the plates 170 and 178 to thereby afford longitudinal adjustment of the latter relative to the rack bars 173a and 173b.

The rack bars 173a and 173b are disposed in substantially horizontally extending, aligned position, and are slidably mounted in tracks 175a and 175b, Fig. 6, respectively, in the upper end portion of a substantially T-shaped plate 177. The plate 177 is mounted on the outer face of the block 143 and secured thereto, in upwardly extending relation, by screws 179.

A substantially rectangular-shaped upwardly opening recess or slot 181 is formed in the longitudinal central portion of the upper edge portion of the plate 177, and a supporting plate 183 extends across the lower end portion of the slot 181 and is secured to the outer face of the supporting plate 177 by screws 184. The screws 184 extend through elongated slots 186 formed in the supporting plate 183 so that the supporting plate may be adjusted upwardly or downwardly on the plate 177. The recess 181 forms an opening through which the wire W may be extended from the source of supply into the carriage $C_2$, and the plate 183 forms a supporting member for such wire which may be readily adjusted to the proper height for supporting the wire in the desired position.

A spacer block 188 projects inwardly from the plate 183 between the rack bars 173a and 173b, Figs. 3, 5 and 6, to thereby limit inward movement of the rack bars 173a and 173b inwardly toward each other.

Reciprocation of the rack bars 173a and 173b, and, therefore, the blades 171a and 171b of the knife 171 is effected by rotation of the shafts 155 and 156 by the rack 131. It will be remembered that the shafts 155 and 156 are connected to the rack 131 by gears 155a and 156a mounted on the lower end portions of the shafts 155 and 156, Figs. 5 and 10, and operatively engaged with the teeth 138 on the rack 131.

The rack bars 173a and 173b are connected to the shafts 155 and 156 by pinions 191 and 192, Figs. 3 and 10. The pinions 191 and 192 are mounted on the upper end portions of the shafts 155 and 156, respectively, Fig. 10, and the teeth thereon are meshed with the teeth 173c and 173d on the inner end portion of the racks 173a and 173b, respectively, Fig. 3.

Hence, oscillation of the shafts 155 and 156, caused by reciprocation of the rack 131 in the carriage C₂, is effective to reciprocate the rack bars 173a and 173b in the plate 177 to thereby reciprocate the blades 171a and 171b toward and away from each other.

The power unit P₂, Figs. 1, 3 and 4, embodies an air cylinder 195 mounted between, and supported by, two brackets 197 and 198 mounted on the base 115. A piston 199 is reciprocably mounted in the casing or cylinder 195 and has a free end portion projecting toward and connected to the rack 131. The piston 199 is disposed in longitudinal alignment with the rack 131 and is connected thereto by a coupling member 201, Fig. 3.

When the power unit P₂ is in normal unactuated condition, with the piston 199 disposed in fully extended position, the rack 131 is disposed in the carriage C₂ in its closest position to the carriage C₁, as shown in solid lines in Fig. 2. When the rack 131 is disposed in this position, the block 143, on which the knife 171 is mounted, is disposed between, and frictionally engaged by, two substantially arcuately shaped leaf springs 203 and 204 mounted on the side rails 127a and 128a, respectively, by screws 206, Figs. 3, 5 and 6. The springs 203 and 204 are convex inwardly and press against the opposite ends of the block 143 to thereby yieldingly hold the block 143 in normal position.

It will be remembered that the blocks 141-143 are connected together as a unit by the shaft 145. Therefore, when the block 143 is held stationary by the springs 203 and 204 the blocks 141 and 142 are likewise held in stationary position.

In the normal operation of my machine, which will be discussed in greater detail hereinafter, when the power unit P₂ is actuated, the piston 199 is caused to move into the cylinder 195, or, in other words, to the right as viewed in Fig. 3. The initial movement of the piston 199 is effective to move the rack 131 longitudinally along the guide rails 127 and 128 from the position shown in solid lines in Fig. 2 to the position shown in Fig. 3. During this movement of the rack 131, the springs 203 and 204 are effective to hold the block 143 and, therefore, the blocks 141 and 142 stationary in the position shown in Fig. 3. However, this movement of the rack 131 relative to the blocks 141-143 is effective to rotate the pinions 152a, 154a and 156a in a clockwise direction, and the pinions 151a, 153a and 155a in a counterclockwise direction, as viewed in Fig. 3, to thereby rotate the blades 164 and 165 of the knives 161 and 162 from the normally open position thereof shown in solid lines in Fig. 2, inwardly toward each other into the closed position shown in Fig. 3. Similarly, the aforementioned rotation of the pinions 155a and 156a is effective to correspondingly rotate the pinions 191 and 192 to thereby move the blades 171a and 171b of the knife 171 inwardly toward each other from the position shown in solid lines in Fig. 2 to the position shown in Fig. 3. This movement of the blades 171a and 171b of the knife 171 inwardly toward each other is effective to move the substantially U-shaped cutting edges 209a and 209b thereof, respectively, Fig. 10, into position to completely sever the wire W therebetween at that point.

The closing movement of the blades 164 and 165 of the knife 161 is effective to swing those blades inwardly toward each other to a position wherein they are effective to sever the insulation on the wire W at that point. The swinging movement of the blades 164 and 165 of the knife 162 does not move those blades into as close relationship to each other as are the blades 164 and 165 of the knife 161. The blades 164 and 165 of the knife 162 are so adjusted on the shafts 153 and 154 that when they are disposed in fully closed position they are only sufficiently close together to firmly grip the insulation of the wire W at that point and preferably do not sever the insulation.

It will be remembered that during the closing movement of the rack bars 173a and 173b the inner end portion of the racks 173a and 173b engage the stop block 188 at the innermost or closed position of the rack bars 173a and 173b. Such engagement of the rack bars 173a and 173b with the stop 188 is effective to prevent further longitudinal movement of the rack 131 relative to the blocks 141-143, in that direction. The gear connection of the knives 161, 162, and 171 with the rack 131 is effective to hold the knives 161, 162 and 171 in closed position so long as the piston 199 continues to pull on the rack 131. Hence, continued movement of the piston 199 to the right is effective not only to move the rack 131 but also to similarly move the closed knives 161, 162 and 171, the force applied to the piston being sufficient to overcome the frictional resistance of the springs 203 and 204 on the block 143, when the rack bars 173a and 173b are stopped by the stop 188.

The knife 161 having severed the insulation of the wire W at that point during the closing movement of the blades 164 and 165 thereof, and the knife 162 having grippingly engaged the wire W at that point during the closing movement of the blades 164, and 165 of this latter knife, such movement of the knives 161 and 162 to the right from the position shown in Fig. 3 to the position shown in broken lines in Fig. 2, is effective to strip the insulation disposed to the right of the knife 161 in Fig. 3 from the end of the wire previously severed by the knife 163. The stripping of the insulation from this portion of the wire is effected by the knife 161 pushing the insulation ahead of it, and the knife 162 gripping the insulation at the point where it is engaged therewith, and thereby assisting the knife 161 in effectively stripping the insulation from the wire W. At the end of the stripping stroke the rack 131 and the blocks 141-143, and associated parts, are disposed in the position shown in broken lines in Fig. 2.

It will be seen that adjustment of the position of the tail unit T toward and away from the head unit H to thereby adjust the length of wire to be cut from the supply of wire, and to be stripped with my novel device, may be quickly and easily made. In making this adjustment the stop S and the knives 66-68 are first adjusted to the proper position in the carriage C₁ to effect stripping of the proper length of insulation from the leading end portion of a wire to be inserted to the left, as viewed in Fig. 1, into the head unit H into engagement with the stop S. Thereafter, the screws 125 on the tail unit T, Fig. 3, may be released from their engagement with the rail 118 and the tail unit T, including the base 115, the carriage C₂, and the power unit P₂, may then be moved longitudinally of the rail 118 into such position that the knife 163 is disposed in proper position to sever the proper length of wire as measured from the stop S in the head unit H. The blocks 141 and 142 may then be adjusted relative to the rack 131 by loosening the screws 147 thereon and moving the blocks 141 and 142 longitudinally of the shaft 145 into their proper positions. The screws 147 on the blocks 141 and 142 may then be tightened, and the blades 164 and 165 may then be adjusted on their respective shafts 151-154 into position wherein they are properly closed upon actuation of the power unit P₂. Similar adjustement of the blades 171a and 171b may be made, the blades 171a and 171b, in this instance, being adjusted longitudinally of the racks 173a and 173b, respectively, into their proper position.

In controlling the operation of my novel device, I prefer to use four control levers 211, 212, 213 and 214, Fig. 1. Each of the levers are connected to, and control the operation of, a respective valve 211A, 212A, 213A and 214A. The valves 211A-214A are each connected to a main supply line 216 by a suitable conduit such as a hose 217, 218, 219 and 220, respectively. The main supply line 216 is connected to a suitable source not shown, of working fluid such as, for example, compressed air.

Four other hoses 222, 223, 224, 225 are each connected at one end to the valves 211A–214A, respectively. The other end of the hose 222 is connected to the end of the cylinder 110 of the power unit $P_3$, which is effective to move the movable jaw 108 of the vise V toward the fixed jaw 105 thereof when compressed air is fed through the line 222. The other end of the hose 223 is connected by a T-coupling 227 to one end of each of the two other hoses 223a and 223b. The other ends of the hoses 223a and 223b are connected to the end of the cylinder 55 disposed furthest from the carriage $C_1$, and the end of the cylinder 195 disposed furthest from the carriage $C_2$, respectively. The other end of the line 224 is connected to the end of the cylinder 55 disposed closest to the carriage $C_1$ of the head unit H. The other end of the hose 225 is connected to the end of the cylinder 195 disposed closest to the carriage $C_2$.

The valves 211a, 213a and 214a are normally closed. That is, they are so constructed that when the levers 211, 213 and 214, respectively, are in normal, unactuated position, the valves are effective to prevent the passage of air from the line 217 to the line 222, from the line 219 to the line 224, and from the line 220 to the line 225, respectively. Downward movement of the free end of the levers 211, 212 and 214 is effective to open the valves 211a, 212a, and 214a, respectively, to thereby permit the flow of compressed air between the lines connected by those respective valves.

The valve 212a is normally open. That is, when the lever 212 is disposed in normal, unactuated position, the valve 212a permits the passage of air from the line 218 into the line 223 and, therefore, into the lines 223a and 223b. Downward movement of the free end of the lever 212 is effective to close the valve 212a, and thereby prevent the passage of air from the line 218 into the lines 223, 223a and 223b.

The power unit $P_3$ is such that the piston 111 thereof is spring urged inwardly in the cylinder 110. Actuation of the power unit $P_3$ by the feeding of compressed air through the line 222 into the cylinder 110 is effective to move the piston 111 outwardly in the cylinder 110, and thereby positively move the movable jaw 108 toward the closed jaw 105.

It will be seen that in the operation of my novel device, after an operator has adjusted the position of the tail unit T relative to the position of the head unit H, and has adjusted the stop member S, and the knives 66–68, 161, 162, and 171 to their proper positions, the operator may then feed a length of wire to the left, as viewed in Fig. 1, over the top of, and longitudinally of, the tail unit T into the right end of the head unit H in such position that the free end of the wire is disposed in engagement with the stop S. The wire may then be disposed in position wherein it lies between the blades 71 and 72 of the knives 66–68, the jaws 105 and 108 of the vise V, the blades 164 and 165 of the knife 161 and 162, and the blades 171a and 171b of the knife 171, and projects outwardly through the slot 181 in the central upper edge portion of the plate 177.

The operator may then depress the handle 211 to thereby close the jaws 108 and 105 of the vise V on the wire W thus positioned in my novel device 25 to thereby hold the wire stationary therein. Thereafter, the operator may depress the handles 212, 213 and 214 simultaneously. This actuation of the handles 212 and 214 is effective to open the valves 213a and 214a to thereby feed compressed air through the lines 224 and 225 into the inner end portions of the cylinders 55 and 195 of the power units $P_1$ and $P_2$, respectively, to thereby urge the pistons 59 and 199 to move outwardly away from each other. The depression of the lever 213 is effective to actuate the valve 213a to thereby interrupt the feeding of compressed air from the line 218 into the lines 223, 223a and 224b, and to vent the lines 223, 223a and 223b to the atmosphere, to thereby relieve the pressure in the cylinders 55 and 195 on the outer ends of the pistons 59 and 199. This, it will be seen, frees the pistons 59 and 199 in the power units $P_1$ and $P_2$ for outward movement in the cylinders 55 and 195 under the urging of the compressed air introduced into the inner end portions of the cylinders 55 and 195 through the valves 213 and 214, and the lines 224 and 225, respectively.

Such movement of the piston 55, is first effective to swing the cam 92 from the position shown in broken lines in Fig. 14 to the position shown in solid lines therein to thereby close the knives 66–68. Closure of the knife 68 is effective to sever the insulation on that portion of the wire W disposed between the blades 71 and 72 thereof. Closure of the knives 66 and 67 is effective to firmly grip the insulation of the wire W disposed between the blades 71 and 72 thereof, respectively.

At the close of this initial movement of the piston 59, the collar 101 has been moved thereby into engagement with the inner face of the end plate 31 of the carriage $C_1$. Continued movement of the piston 55 through this stroke thereof is, therefore, effective to move the carriage $C_1$, with the knives 66–68, to the left, as viewed in Figs. 12 and 13, to thereby strip the insulation disposed to the left of knife 68 from that end of the wire W.

During this actuation of the head unit H, the tail unit T is being similarly actuated. Thus, the initial portion of the aforementioned movement of the piston 199 is effective to move the rack 131 to the right, as viewed in Fig. 2, in the carriage $C_2$, from the position shown in solid lines in Fig. 2 to the position shown in Fig. 3. Such movement of the rack 131 is effective to close the knives 161, 162 and 171. Closure of the knife 171 is effective to completely sever that portion of the wire W disposed between the blades 171a and 171b thereof. Closure of the knife 161 is effective to sever the insulation on that portion of the wire W disposed between the blades 164 and 165 thereof. Closure of the knife 162 is effective to firmly grip the insulation on that portion of the wire W disposed between the blades 164 and 165 thereof.

At the end of this initial movement of the piston 199, the rack bars 173a and 173b are stopped in a positive manner by the stop 188 to thereby lock the gears 151a—156a in engagement with the rack 131 so that throughout the remainder of the stroke of the piston 199, the knives 161, 162, and 171 are moved with the rack 131 to the right, as viewed in Fig. 2, from the position shown in solid lines in Fig. 2 to the position shown in broken lines therein. This movement of the knives 161 and 162 is effective to strip the insulation disposed at the right of the knife 161 from that end portion of the thus severed length of wire W.

The lever 211 may then be released to thereby close the valve 211a between the lines 217 and 222 and vent the cylinder 110 to the atmosphere and thereby free the piston 111 to movement to the right, as viewed in Fig. 11, to thereby open the vise V.

Thereafter, the operator may lift the length of wire from the machine 25 and the levers 212–214 may then be released by the operator to thereby close the valve 213a between the lines 219 and 224, and the valve 214a between the lines 220 and 225, and open the valve 212 between the lines 218 and 223. Such actuation of the valves 213a and 214a is effective to vent the lines 224 and 225 to the atmosphere to thereby free the piston 199 to the urging of the compressed air in the lines 223a and 223b on the outer ends of the pistons 59 and 199, respectively, and thereby cause the pistons 59 and 199 to move inwardly on their return strokes. This return movement of the pistons 59 and 199 is effective to return the carriages $C_1$ and $C_2$ to their normal, at rest positions.

The operator may then advance another length of the wire W into position in the machine 25 and the operations may be repeated.

While the operation of my machine has been described above as involving simultaneous actuation of the head unit H and the tail unit T, it will be understood that, if desired, the two units may be actuated separately and successively by successively actuating the levers 213 and 214. However, in any event, during actuation of the head unit H and the tail unit T, either simultaneously or individually, the lever 212 must be depressed so as to free the pistons 59 or 199 for outward movement in the cylinders 55 and 195. This, it will be seen, affords an effective safety device for my novel machine because the levers 211 and 212 are preferably disposed in such position relative to each other that they may be actuated by one hand, and the levers 213 and 214 are so disposed that they may be actuated by the other hand, but none of the levers in either pair of levers may be actuated with levers in the other pair by one hand. This means that in order to close the knives in either the carriage $C_1$ and $C_2$, or both, the operator must use both hands, one hand to actuate the lever 212 and the other hand to actuate the levers 213 or 214 or both, and, hence, can not place his fingers between the blades of any of the knives during closing movement thereof.

From the foregoing it will be seen that I have afforded a novel wire stripping machine which is relatively simple in construction and is simple and efficient in operation.

Also, it will be seen that I have afforded such a machine that can be quickly and easily adjusted to handle different sizes and lengths of wires.

In addition, it will be seen that I have afforded a practical, novel, and efficient wire stripping machine which is effective in a novel manner to efficiently strip insulation off from ends of a wire without deforming the wire.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A wire stripper for removing an insulation coating from both ends of a predetermined length of wire simultaneously, said stripper comprising two insulation severing means movably mounted for movement toward and away from each other, said two means being disposed relative to each other in position to receive such a length of wire therebetween with each of said two means disposed in insulation-cutting relation to the insulation on a respective end portion of said wire in spaced relation to the free end of said respective end portion, two insulation gripping means movably mounted for movement toward and away from each other, each of said two gripping means being disposed in insulation-gripping position between a respective one of said first mentioned means and said respective free end of said wire, means connected to said severing means and to said gripping means for moving said two severing means outwardly away from each other and said two gripping means outwardly away from each other longitudinally of said length of wire, means normally connected to said severing means and said gripping means in position to hold said severing means and said gripping means against said outward movement, and means for releasing said holding means from said holding connection with said severing means and said girpping means simultaneously to thereby free said severing means and said gripping means simultaneously to said outward movement by said moving means to thereby simultaneously strip said insulation disposed between said severing means and said respective ends of said wire from said wire.

2. A wire stripper for removing an insulation coating from an end of a wire comprising, means for gripping such a wire in position to hold said wire stationary, means for severing the insulation on said wire in spaced relation to one end of said wire, means adjustably movable toward and away from said last named means for gripping said insulation between said severing means and said one end of said wire, and means connected to said severing means and said gripping means for simultaneously moving said severing means and said gripping means away from said holding means and toward said one end of said wire to strip said insulation between said severing means and said one end of said wire from the latter.

3. A wire stripper for removing insulation coating from a length of wire comprising means for holding said wire stationary in a predetermined position, two insulation severing means, each of said two severing means being disposed in position to engage said wire in spaced relation to a respective end of the latter, each of said severing means having a closed position wherein said means are effective to sever the insulation on said wire, and an open position wherein said severing means are ineffective to sever said insulation on said wire, two gripping means, each of said gripping means being disposed in position to engage said wire between a respective one of said severing means and said respective end of said wire, each of said gripping means having a closed position wherein said means are effective to grip insulation on said wire between said respective severing means and said respective one end, and an open position wherein said gripping means are ineffective to grip said insulation on said wire, and means for actuating said severing means and said gripping means, said actuating means including means connected to said severing means and said gripping means and movable outwardly away from, and inwardly toward each other through a predetermined path of travel, said movable means being operable during said outward movement thereof to first move said severing means and said gripping means from said open position to said closed positions and then move said severing means outwardly away from each other and said gripping means outwardly away from each other longitudinally of said length of wire, to thereby strip said insulation between said severing means and said respective ends of said wire from said wire.

4. A wire stripper for removing insulation coating from a wire comprising means for holding a predetermined length of said wire stationary in a predetermined position, two pairs of wire-engaging means, each of said pairs comprising means for severing the insulation on said wire, and means for gripping the insulation on said wire, each of said severing means being disposed in position to engage said wire inwardly of a respective end of said length thereof, each of said gripping means being disposed in position to engage said wire between said severing means in said corresponding pair and said respective end of said length of wire, said pairs being adjustably movable toward and away from each other, and said two means in each of said pairs being adjustably movable toward and away from each other, each of said severing means and gripping means having an open position and a closed position, said severing means, when in said closed position, being effective to sever said insulation, and, when in said open position, being ineffective to sever said insulation, each of said gripping means, when in said closed position, being effective to grip said insulation, and, when in said open position, being ineffective to grip said insulation, and means for actuating said wire engaging means, said actuating means comprising means connected to said wire engaging means for simultaneously moving all of said severing means and said gripping means from said open positions to said closed positions and then moving said two pairs outwardly away from each other longitudinally of said wire.

5. A wire stripper for removing insulation coating from a wire comprising means for holding a predetermined length of said wire stationary in a predetermined position, two pairs of wire-engaging means, each of said pairs comprising means for severing the insulation on said wire in spaced relation to a respective end of said length thereof, and means for gripping said insulation on said wire between said last named means and said respective one end of said length of wire, said wire-engaging means being movable into and out of position to engage said wire, said pairs of wire-engaging means being reciprocable toward and away from each other longitudinally of said wire, resilient means for holding said wire-engaging means against said reciprocatory movement during movement thereof into position to engage said wire, and means for actuating said wire-engaging means, said actuating means comprising means connected to said wire-engaging means for first moving the latter into said position to engage said wire and subsequently moving said pairs of wire engaging means away from each other against the urging of said resilient means.

6. A wire stripper for removing insulation coating from a wire comprising means for holding a predetermined length of said wire stationary in a predetermined position, two pairs of wire-engaging means, each of said pairs comprising means for severing the insulation on said wire, and means for gripping the insulation on said wire, each of said severing means being disposed in position to engage said wire inwardly of a respective end of said length thereof, each of said gripping means being disposed in position to engage said wire between said severing means in said corresponding pair and said respective end of said length of wire, said pairs being adjustably movable toward and away from each other, and said two means in each of said pairs being adjustably movable toward and away from each other, each of said severing means and gripping means having an open position and a closed position, said severing means, when in said closed position, being effective to sever said insulation, and, when in said open position, being ineffective to sever said insulation, each of said gripping means, when in said closed position, being effective to grip said insulation, and, when in said open position, being ineffective to grip said insulation, and means for actuating said wire engaging means, said actuating means including two elongated members movable longitudinally toward and away from each other longitudinally of said wire, each of said members being connected to a respective pair of said wire engaging means and being operable upon movement away from the other of said members to first move said wire-engaging members in said respective pair from said open position to said closed position and then move said pair of wire-engaging members away from said other pair, and means for moving said elongated members simultaneously outwardly away from each other.

7. A wire stripper for removing insulation coating from a wire comprising means for holding a predetermined length of said wire stationary in a predetermined position, two pairs of wire-engaging means, each of said pairs comprising means for severing the insulation on said wire, and means for gripping the insulation on said wire, each of said severing means being disposed in position to engage said wire inwardly of a respective end of said length thereof, each of said gripping means being disposed in position to engage said wire between said severing means in said corresponding pair and said respective end of said length of wire, said pairs being adjustably movable toward and away from each other, and said two means in each of said pairs being adjustably movable toward and away from each other, each of said severing means and gripping means having an open position and a closed position, said severing means, when in said closed position, being effective to sever said insulation, and, when in said open position, being ineffective to sever said insulation, each of said gripping means, when in said closed position, being effective to grip said insulation, and, when in said open position, being ineffective to sever said insulation, and means for actuating said wire engaging means, said actuating means comprising two fluid motors, each of said motors comprising an elongated cylinder, and an elongated piston reciprocably mounted in said cylinder for longitudinal reciprocation therein, said pistons being disposed in longitudinal alignment with each other and reciprocable in said cylinders toward and away from each other, each of said pistons being operatively connected to said wire-engaging means in a respective one of said pairs in position to be operable upon reciprocation away from the other of said pistons to first move said wire-engaging means in said pair from said open position to said closed position thereof and then move said pair outwardly away from the other of said pairs longitudinally of said wire, means connected to said motors for feeding working fluid to said cylinders for causing reciprocation of said cylinders, and means connected to said last named means for controlling the flow of working fluid to said motors for causing said pistons to reciprocate simultaneously.

8. In a wire stripper, a supporting base, an elongated carriage movably mounted on said base for longitudinal reciprocation thereon, a plurality of pairs of blades mounted on said carriage, said blades in each of said pairs being movable relative to each other between open and closed position, means on said base for holding an insulated wire in position wherein one end portion of said wire is disposed in said carriage with said wire disposed between said blades of each of said pairs, said blades in one of said pairs being so disposed relative to each other that, when disposed in said closed position, said blades are effective to sever said insulation on said wire, said blades in the others of said pairs being disposed on the opposite side of said one pair from said holding means and being so disposed relative to each other, when in said closed position, that they are effective to grip said insulation without severing the same, and means connected to said carriage for moving said carriage away from said holding means when said blades are in said closed position to thereby strip insulation from that portion of said wire disposed on the opposite side of said one pair of blades from said holding means.

9. In a wire stripper, supporting means, a carriage movably mounted on said means for reciprocation through a predetermined path of movement, two knives mounted on said carriage, each of said knives comprising a pair of blades disposed in a substantially vertical plane and rotatable relative to each other in said plane between an open and closed position, means mounted on said supporting means for holding an insulated wire in position wherein one end portion thereof is disposed between said blades of each of said knives, one of said pairs of blades being disposed closer to said holding means than the other pair of said blades and means, including said carriage, movable through a cycle of operation for actuating said knives to strip insulation from said end portion of said wire, said last named means being connected to said knives and being operable in said cycle of operation to move said one pair of blades from open to closed position relative to each other into position to sever the insulation on said end portion, and to move the other of said pairs of blades from open to closed position relative to each other into position to grip said insulation on said end portion, and thereafter move said knives away from said holding means to thereby strip insulation from said end portion.

10. In a wire stripper, supporting means, a carriage mounted on said means, a plurality of knives, each of said knives comprising two blades mounted on said carriage, one of said two blades in each of said knives being adjustably mounted on said carriage in stationary position relative thereto, the other of said two blades in each of said knives being adjustably and rotatably mounted on said carriage for rotary movement between open and closed position relative to said one blade of the same knife, means for holding an insulated wire in stationary position, said knives being so disposed relative to said holding means that, when said blades are disposed in said open position, one end portion of said wire is disposed between said blades, and means operatively connected to said blades and movable through a predetermined path of travel for actuating said knives to strip insulation from said end portion of said wire, said last mentioned means being operable to move said other blade of each of said knives into said closed position in engagement with said insulation and thereafter move said knives away from said holding means toward the free end of said end portion with said knives disposed in said closed position.

11. In a wire stripper, supporting means, a carriage mounted on said means, a plurality of knives, each of said knives comprising two blades mounted on said carriage, one of said two blades of each of said knives being adjustably mounted on said carriage in stationary position relative thereto, the other of said two blades of each of said knives being adjustably and rotatably mounted on said carriage for rotary movement between open and closed position relative to said one blade of the respective knife, means for holding an insulated wire in stationary position, said knives being so disposed relative to said holding means that, when said blades are disposed in said open position, one end portion of said wire is disposed between said blades and supported thereby, the two blades of at least one of said knives, when disposed in said closed position, being disposed in position relative to each other to sever said insulation on said end portion from the insulation on the remainder of said wire, the two blades of the other of said knives, when disposed in said closed position, being disposed in position relative to each other to clampingly engage said insulation on said end portion therebetween between said one pair of blades and the free end of said end portion, and means connected to said carriage and operable to first move said blades from said open to said closed positions and thereafter move said carriage and said knives away from said holding means to thereby strip said insulation from said end portion.

12. In a wire stripper, supporting means, an elongated carriage mounted on said means, a plurality of knives, each of said knives comprising two blades mounted on said carriage, said knives being spaced from each other longitudinally of said carriage, one of said two blades of each of said knives being adjustably mounted on said carriage in stationary position relative thereto, said other of said two blades of each of said knives being adjustably and rotatably mounted on said carriage for rotary movement between open and closed position relative to said one blade of the respective knife, means disposed in longitudinal alignment with said carriage for holding an insulated wire in stationary position, said knives being so disposed relative to said holding means that, when said blades are disposed in said open position, one end portion of said wire may be disposed between said blades, means connected to said other blades yieldingly urging the latter toward said open position, cam means mounted on said carriage and connected to said other blades for moving the latter into said closed position, and means connected to said carriage for longitudinally moving the latter away from said holding means, said carriage-moving means being connected to said cam means and being operable to first actuate said cam means to move said other blades into said closed position and then longitudinally move said carriage and, thereby, said knives away from said holding means.

13. In a wire stripper, an elongated base, an elongated carriage mounted on one end portion of said base in substantially parallel relation thereto, two elongated supporting members mounted in said carriage in longitudinal extending relation thereto and in substantially parallel spaced relation to each other, one of said supporting members being non-rotatably mounted in said carriage, the other of said supporting members being rotatably mounted in said carriage, a plurality of knives, each of said knives comprising a pair of blades, one blade of each of said pairs being adjustably mounted in fixed position on said one supporting member, the other blade of each of said pairs being adjustably mounted on said other supporting member for rotation therewith, each of said other blades being rotatable with said other supporting member between open and closed positions relative to said one blade of the respective pair, said two blades of each of said pairs having end portions disposed in spaced relation to each other in position to loosely support therebetween a wire to be stripped when said other blade thereof is disposed in said open position, said end portions of said two blades of each of said pairs being disposed in position relative to each other to receive therebetween said wire to be stripped, means on said base in longitudinal alignment with said carriage for holding such a wire stationary with one end portion thereof disposed between said two blades of each of said pairs, the two blades of one of said pairs being disposed closer to said holding means than said blades of the other of said pairs and being so disposed relative to each other that, when said other blade of said one pair is disposed in said closed position, said two blades of said one pair are disposed in position to sever the insulation of said wire disposed therebetween, the other of said pairs being disposed between said one pair and the free end of said end portion of said wire, the two blades of the other of said pairs being so disposed relative to each other that, when said one blade thereof is disposed in said closed position, said two blades of said other of said pairs are disposed in position to grippingly engage the insulation of said wire disposed therebetween, and means mounted on said base for moving said one blade of each of said pairs from said open position to said closed position when such a wire is so disposed in said holding means, and then moving said carriage, and thereby said knives, longitudinally of said base away from said holding means to thereby strip insulation from said end portion of said wire.

14. In a wire stripper, an elongated base, an elongated carriage mounted on one end portion of said base in substantially parallel relation thereto, two elongated supporting members mounted in said carriage in longitudinal extending relation thereto and in substantially parallel spaced relation to each other, one of said supporting members being non-rotatably mounted in said carriage, the other of said supporting members being rotatably mounted in said carriage, a plurality of knives, each of said knives comprising a pair of blades, one blade of each of said pairs being adjustably mounted in fixed position on said one supporting member, the other blade of each of said pairs being adjustably mounted on said other supporting member for rotation therewith, each of said other blades being rotatable with said other supporting member between open and closed positions relative to said one blade of the respective pair, said two blades of each of said pairs having end portions disposed in spaced relation to each other in position to loosely support therebetween a wire to be stripped when said other blade thereof is disposed in said open position, means on said base for holding such a wire stationary with one end portion thereof disposed between said two blades of each of said pairs, the two blades of one of said pairs being so disposed relative to each other that, when said other blade of said one pair is disposed in said closed position, said two blades of said one pair are disposed in position to sever the insulation of said wire disposed therebetween, the other of said pairs being disposed between said one pair and the free end of said end portion of said wire and on the opposite side of said one pair from said holding means, the two blades of the other of said pairs being so disposed relative to each other that, when said one blade thereof is disposed in said closed position, said two blades of said other of said pairs are disposed in position to grippingly engage the insulation of said wire disposed therebetween, a weight mounted on said other supporting member in position to urge the latter to rotate in a direction to move said other blades to said open position, and reciprocatory means mounted on said base and connected to said other blades for moving said blades between said open and closed positions and moving said carriage toward and away from said holding means to thereby strip insulation from said end portion of said wire.

15. In a wire stripper, an elongated base, an elongated carriage mounted on one end portion of said base in substantially parallel relation thereto, two elongated supporting members mounted in said carriage in longitudinal extending relation thereto and in substantially parallel spaced relation to each other, one of said supporting members being non-rotatably mounted in said carriage, the other of said supporting members being rotatably mounted in said carriage, a plurality of knives, each of said knives comprising a pair of blades, one blade of each of said pairs being adjustably mounted in fixed position on said one supporting member, the other blade of each of said pairs being adjustably mounted on said other supporting member for rotation therewith, each of said other blades being rotatable with said other supporting member between open and closed positions relative to said one blade of the respective pair, said two blades of each of said pairs having end portions disposed in spaced relation to each other in position to loosely support therebetween a wire to be stripped when said other blade thereof is disposed in said open position, means on said base for holding such a wire stationary with one end portion thereof disposed between said two blades of each of said pairs, the two blades of one of said pairs being so disposed relative to each other that, when said other blade of said one pair is disposed in said closed position, said two blades of said one pair are disposed in position to sever the insulation of said wire disposed therebetween, the other of said pairs being disposed between said one pair and the free end of said end portion of said wire, the two blades of the other of said pairs being so disposed relative to each other that, when said one blade thereof is disposed in said closed position, said two blades of said other of said pairs are disposed in position to grippingly engage the insulation of said wire disposed therebetween, a weight mounted on said other supporting member in position to urge the latter to rotate in a direction to move said other blades to said open position, an elongated member movably mounted on said base for reciprocation toward and away from said holding means between a normal position and an actuated position, said elongated member being connected to said other knives and operable to move said other knives from said open position to said closed position against the urging of said weight during the initial movement of said elongated member from said normal position to said closed position, stop means on said elongated member and engageable with said carriage at the close of said initial movement to thereby operatively connect said elongated member to said carriage and move said carriage away from said holding means with said elongated member during the remainder of said movement of the latter between said normal and actuated positions, and means for reciprocating said elongated member between said normal and actuated positions to thereby actuate said other blades and move said carriage.

16. In a wire stripper, supporting means, a carriage reciprocably mounted on said means, two knives mounted on said carriage and movable therewith for stripping insulation from a portion of a wire, each of said knives comprising two blades, each of said blades having a leading edge, said two blades of each of said knives having a closed position wherein said leading edges thereof are disposed in position relative to each other to grip such a wire therebetween, and an open position wherein said leading edges are disposed further apart than when in said closed position, said two blades in each of said knives being horizontally movable on said carriage between said open and closed positions, means mounted on said supporting means for gripping said wire in position to hold said wire stationary between said blades, means mounted on said carriage and movable relative thereto for moving said blades between said open and closed positions, and means connected to said last named means and operable to move the latter to thereby move said blades to said closed position and then to move said carriage on said supporting means longitudinally of said wire and away from said holding means to thereby strip insulation from a portion of said wire.

17. In a wire stripper, supporting means, a carriage reciprocably mounted on said means, two knives mounted on said carriage and movable therewith for stripping insulation from a portion of a wire, each of said knives comprising two blades, each of said blades having a leading edge, said two blades of each of said knives having a closed position wherein said leading edges thereof are disposed in position relative to each other to grip such a wire therebetween, and an open position wherein said leading edges are disposed further apart than when in said closed position, said two blades in each of said knives being horizontally movable on said carriage between said open and closed positions, means on said supporting means for holding said wire stationary, an elongated rack movably mounted on said carriage for longitudinal reciprocation relative thereto between a normal position and an actuated position, said rack being connected to said blades and operable to move the latter from said open position to said closed position and back to said open position during reciprocation of said rack from said normal position to said actuated position and back to said normal position, and means connected to said carriage for reciprocating the latter longitudinally of said wire and toward and away from said holding means to thereby strip insulation from a portion of the latter, said last named means being connected to said rack and being operable to move said rack from said normal position to said actuated position during the initial portion of one stroke of said reciprocation of said carriage.

18. In a wire stripper, elongated supporting means, a carriage movably mounted on said means for reciprocation longitudinally thereof, said carriage including an elongated rack slidably mounted in substantially parallel relation to said supporting means for longitudinal reciprocation between a normal position and an actuated position, four shafts rotatably mounted in said carriage in upright position for movement therewith, two knives, each of said knives comprising two blades, each of said blades having a leading edge thereon and being mounted on a respective one of said shafts for movement therewith with said leading edge thereof disposed in substantially upright position, said two blades of each of said knives having a closed position wherein said leading edges thereof are disposed in position to grippingly engage the insulation on such a wire disposed therebetween, and an open position wherein said leading edges thereof are spaced apart a sufficient distance to receive said wire therebetween, gears mounted on said shafts and operatively engaged with said rack for rotation by said rack during said reciprocation of the latter to rotate said shafts and thereby rotate said blades between said open and closed positions, stop means on said carriage for limiting said reciprocation of said rack, and means for actuating said knives to strip said insulation from a portion of said wire, said last named means comprising means connected to said carriage and said rack and operable to move said rack from said normal position to said closed position and then move said carriage through one stroke of a reciprocation.

19. In a wire stripper, supporting means, a carriage movably mounted on said means for reciprocation relative thereto through a predetermined path of travel, a plurality of knives mounted on said carriage for reciprocation therewith, each of said knives comprising two blades movable between open position and closed position relative to each other, means mounted on said supporting means for holding an insulation-covered wire to be stripped stationary with a portion of the latter disposed between said blades of said knives, said blades of each of said knives, when disposed in said open position, being disposed in position relative to each other to receive said wire therebetween, said blades of one of said knives, when in said closed position, being disposed in position relative to each other to sever said wire therebetween, said blades of another of said knives, when in said closed position, being disposed in position relative to each other to sever the insulation of said wire therebetween, said blades of the remainder of said knives, when in said closed position, being disposed in position relative to each other to grip said insulation of said wire therebetween, said remainder of said knives being disposed between said one knife and said other knife, and means for moving said carriage away from said holding means in the direction from said other knife toward said one knife to thereby strip said insulation from said wire between said one knife and said other knife.

20. In a wire stripper, supporting means, a carriage movably mounted on said means for reciprocation relative thereto through a predetermined path of travel, a plurality of knives mounted on said carriage for reciprocation therewith, each of said knives comprising two blades movable between open position and closed position relative to each other, means mounted on said supporting means for holding an insulation-covered wire to be stripped stationary with a portion of the latter disposed between said blades of said knives, said blades of each of said knives, when disposed in said open position, being disposed in position relative to each other to receive said wire therebetween, said blades of one of said knives, when in said closed position, being disposed in position relative to each other to sever said wire therebetween, said blades of another of said knives, when in said closed position, being disposed in position relative to each other to sever the insulation of said wire therebetween, said blades of the remainder of said knives, when in said closed position, being disposed in position relative to each other to grip said insulation of said wire therebetween, said remainder of said knives being disposed between said one knife and said other knife, a rack movably mounted on said carriage for reciprocation relative thereto between a normal position and an actuated position, said rack being connected to said knives and operable during said reciprocation of said rack to move said blades of said knives between said open and closed positions, said rack being operable, when in said normal position, to hold said blades in said open position, and, when in said actuated position, to hold said blades in said closed position, and means for actuating said knives to thereby strip insulation from said wire, said last named means comprising means connected to said rack and said carriage and operable to first move said rack from said normal position to said actuated position and then reciprocate said carriage through said path of travel toward and away from said holding means longitudinally of said wire.

21. The combination defined in claim 20, and wherein said blades of said one knife are reciprocably mounted on said carriage for reciprocation relative thereto between said open and closed positions, and which includes stop means mounted on said carriage in position to stop said blades of said one knife in said closed position, during movement thereof from said open to said closed position, to thereby stop said rack relative to said carriage and initiate movement of said carriage.

References Cited in the file of this patent

UNITED STATES PATENTS

| | | |
|---|---|---|
| 1,626,119 | Olin | Apr. 26, 1927 |
| 1,802,453 | Wright | Apr. 28, 1931 |
| 1,998,391 | Shaw | Apr. 16, 1935 |
| 2,285,167 | Montgomery | June 2, 1942 |
| 2,563,911 | Beck | Aug. 14, 1951 |
| 2,718,802 | Cook | Sept. 27, 1955 |